Nov. 26, 1940.   T. B. RAGSDALE   2,222,802
SELF-FASTENING LINE REEL
Filed May 29, 1939
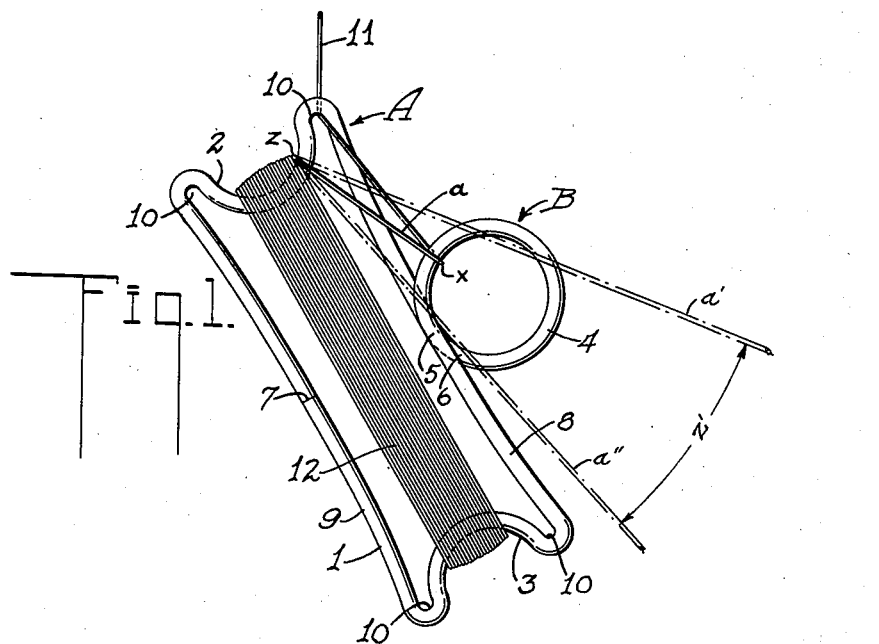
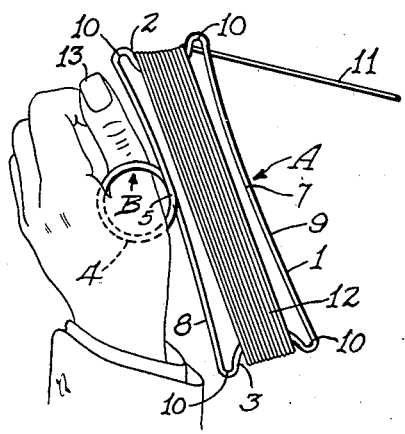
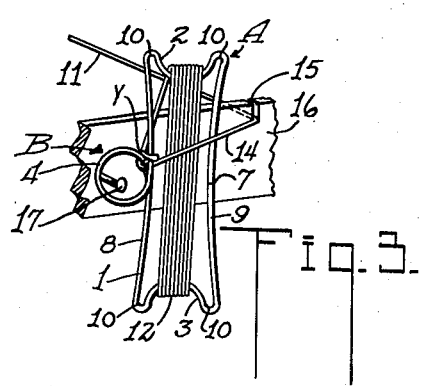
INVENTOR.
TYRUS B. RAGSDALE
BY
ATTORNEYS.

Patented Nov. 26, 1940

2,222,802

UNITED STATES PATENT OFFICE 2,222,802

SELF-FASTENING LINE REEL

Tyrus B. Ragsdale, San Francisco, Calif.

Application May 29, 1939, Serial No. 276,366

3 Claims. (Cl. 242—96)

My invention relates to improvements in a self-fastening line reel, and it consists of the combinations, constructions and arrangements hereinafter described and claimed.

An object of my invention is to provide a self-fastening line reel which is preferably constructed from a single piece of material such as a wire, this wire being bent in a novel shape for providing a line-carrying portion and a ring that can act as a handle during the time the line is wound on the reel. The ring is also made large enough to receive the thumb and permit the ring to oscillate on the thumb when the line is unwound from the reel.

One of the principal features of the invention is the provision of a ring which is split and in which the side portions of the two ends of the ring frictionally contact with each other for gripping a portion of the line therebetween. A part of the line may be moved into the interior of the ring by forcing the line between the contacting split portions. In this simple way, the line may be secured to the reel in such a way that the reel will be supported by the line and without the line becoming accidentally unwound from the reel. It is possible to fasten the line more securely to the ring by wrapping it around the base portion of the ring a number of times and forcing the line between the ring contacting portions each time. The ring itself also performs a further function of acting as a cam for guiding the portion of the line contacting with the ring, toward the base of the ring where the line may be readily moved between the contacting split ring portions.

The device may be used for a large number of purposes and the self-fastening feature of the split ring permits any portion of the line to be quickly secured to the ring without the necessity of tying the line to the reel by a special knot. The line may also be quickly unfastened from the ring.

Other objects and advantages will appear in the following specification, and the novel features of the device will be particularly pointed out in the appended claims.

My invention is illustrated in the accompanying drawing forming a part of this application, in which Figure 1 is a plan view of the device;

Figure 2 shows the device mounted on the thumb and in a position to permit the unwinding of the line from the reel; and Figure 3 shows the device secured to a support.

In carrying out my invention, I provide a device having a reel portion A and a split ring or handle portion B. The device is preferably made from a single piece of wire indicated generally at 1, although it may be cast from a plastic material, if desired. The wire is shaped for providing arcuate recesses 2 and 3 for forming the reel and is further shaped into a split ring 4 that has its two ends 5 and 6 frictionally contacting with each other. The ends of the wire 1 are preferably butt welded at 7. It will be noted that the arcuate recesses 2 and 3 are spaced from the sides 8 and 9 and provide four small recesses 10.

From the foregoing description of the various parts of the device, the operation thereof may be readily understood.

A line 11 is wrapped around the reel as shown at 12 and is held in place by the recesses 2 and 3. The free end of the line may be quickly fastened to the reel to prevent it from accidentally unwinding. To accomplish this, the portion $a$ of the line is moved into contact with the plane of the ring 4, see Figure 1, and then this line portion is moved across the face of the ring from the broken line position $a'$ toward the other broken line position $a''$ and this movement is continued until the line passes under the curved end 6 of the ring. The line may now be swung back toward the broken line position $a'$ and this will force the line between the contacting portions 5 and 6 of the ring. The portion $a$ of the line will now extend through the ring and the line may be folded back on itself at the point $x$ and then it will extend through one of the small recesses 10 and upwardly to the article not shown, to which the line is attached. It will be seen from this description that the line may be thus quickly fastened to the reel so as to prevent its unwinding without the need of actually tying the line to the reel by a knot.

In Figure 2, I show how the device is used when unwinding the line 11 from the reel A. The ring B is slipped over the thumb 13 and then as much line as desired is merely pulled from the reel. During the unwinding of the line, the reel will oscillate back and forth about the thumb as a pivot and the ring will act as a bearing. It is possible to remove the line very quickly from the reel in this manner.

In Figure 3, I show how the line may be more securely fastened to the ring than that shown in Figure 1. In this instance, the line is wound around the base of the ring in the same manner as already described in Figure 1, but a number of loops of the line are made about the ring base and this will cause the line to become fastened to the ring base at the point y. The free portion of the line may then extend across the face of the reel as shown at 14 and extend through a slot 15 in a board 16. The reel is held against movement by a nail 17 that is hammered into the board 16, the nail receiving the ring B. It is clear from this showing, that one or more turns of the line about the base of the ring will securely fasten the line to the reel. This type of fastening is resorted to when the line is not in use or when the ring is used to fasten the line to the work.

It will be seen that the split ring performs four functions. In the first place, it acts as a handle while the line is being wound on the reel. In the second place, it acts as a point of pivot when it is slipped over the thumb and the line is being unwound from the reel. In the third place, the line may be slipped past the contacting split portions of the ring and therefore the line cannot unwind from the reel. This obviates the necessity of tying the line to the reel by a knot. The line can also be wrapped a number of times about the ring base and be fastened in place. In the fourth place, the plane of the ring acts as a cam surface for guiding the line toward the base of the ring when the reel is swung for inclining the plane of the ring at the proper angle. This permits the free portion of the line to extend from the point z and extend in any direction over a wide angle indicated by the double arrow line z'. The string portion a when in any position between the extremes of the wide angle will be contacted by the ring and the ring can be moved for camming and guiding the line toward the ring base where it can be gripped by the overlapping ring portions 5 and 6 and thus be secured to the device.

The fastening of the line as shown in Figure 1, takes the place of the customary "half hitch" which would otherwise be necessary to make in the line. The additional turns of the line about the base of the ring as shown in Figure 3, will securely fasten it to the reel so that the reel need not be suspended from the line shown in Figure 1, but may be laid on a supporting surface. The fastening of the line to the ring may be accomplished by the same winding motion used in winding the line on the reel. The line is merely pulled to one side a distance to clear the reel and then the winding is continued about the ring base. Each loop of the line is drawn tight in order to force the line between the line gripping portions 5 and 6.

While I have shown only the preferred form of my invention, it should be understood that various changes or modifications may be made within the scope of the appended claims without departing from the spirit of the invention.

The reel saves time in winding the line because the reel is long and each loop of the line consumes a considerable portion of the line. When a stick is used, a much longer time is necessary to wind the same amount of line because less line is consumed for each convolution and the operator has to move his hand that feeds the line, around the stick a great number of times.

I claim:

1. A self-fastening line reel comprising a single endless wire bent to form an elongated reel with inwardly extending arcuate-shaped ends for receiving a line, a portion of the wire forming one side being bent into a helix to form a split ring whose ends overlie each other for a short distance and then extend to form said side, the overlying helical portions frictionally engaging with each other to grip and hold a portion of the line disposable therebetween.

2. A self-fastening line reel comprising a single wire bent to form an elongated reel with inwardly extending arcuate-shaped ends and substantially straight sides, the arcuate portions being spaced slightly from the sides of the reel to form line-receiving recesses between the arcuate portions and the sides, a portion of the wire forming one side being bent into one loop of a helix to form a split ring whose ends extend to form the said one side and overlie each other for a short distance and frictionally engage with each other to grip and hold a line portion disposable therebetween.

3. A self-fastening line reel comprising a single wire bent to form an elongated reel with inwardly extending arcuate-shaped ends and substantially straight sides, the arcuate portions being spaced slightly from the sides of the reel to form line-receiving recesses between the arcuate portions and the sides, a portion of the wire forming one side being bent into one loop of a helix to form a split ring whose ends extend to form the said one side and overlie each other for a short distance and frictionally engage with each other to grip and hold a line portion disposable therebetween, the other side of the reel having the ends of the wire arranged in abutting relation and welded together.

TYRUS B. RAGSDALE.